US012129697B2

(12) United States Patent
Naylor

(10) Patent No.: US 12,129,697 B2
(45) Date of Patent: Oct. 29, 2024

(54) LONG THROW LOCK

(71) Applicant: Mark Naylor, Warrington (GB)

(72) Inventor: Mark Naylor, Warrington (GB)

(*) Notice: Subject to any disclaimer, the term of this patent is extended or adjusted under 35 U.S.C. 154(b) by 0 days.

(21) Appl. No.: 17/960,846

(22) Filed: Oct. 6, 2022

(65) Prior Publication Data

US 2023/0112383 A1 Apr. 13, 2023

(30) Foreign Application Priority Data

Oct. 8, 2021 (GB) ..................................... 2114415

(51) Int. Cl.
*E05C 9/04* (2006.01)
*E05B 17/04* (2006.01)

(52) U.S. Cl.
CPC ............ *E05C 9/041* (2013.01); *E05B 17/042* (2013.01); *E05C 9/047* (2013.01)

(58) Field of Classification Search
CPC ........ E05C 9/041; E05C 9/047; E05B 17/042; E05B 63/0021; E05B 63/0017; Y10T 292/1018
See application file for complete search history.

(56) References Cited

U.S. PATENT DOCUMENTS 2,376 A * 11/1841 Hoggan .................... E05C 1/14 292/170
61,185 A * 1/1867 Fowler ...................... E05C 1/06 292/142
79,879 A * 7/1868 Washburn ........... E05B 63/0017 70/134
136,861 A * 3/1873 Pelham ..................... E05C 1/06 292/142
148,274 A * 3/1874 Wolf ................... E05B 63/0017 70/134
160,285 A * 3/1875 Royle ................. E05B 63/0017 292/DIG. 15
166,619 A * 8/1875 Martin ................ E05B 63/0017 70/134
180,353 A * 7/1876 Kleyensteuber .... E05B 15/0053 292/142

(Continued)

FOREIGN PATENT DOCUMENTS

CN 210122849 U 3/2020
DE 19538320 A1 5/1996

(Continued)

*Primary Examiner* — Christine M Mills
*Assistant Examiner* — Faria F Ahmad
(74) *Attorney, Agent, or Firm* — Jose Cherson Weissbrot

(57) ABSTRACT

A lock with an extended bolt throw comprising a back plate, a locking bolt having a rack gear profile on at least a portion of one side, slidably mounted to the back plate movable between a first position and a second position. An accelerator gear mounted to the back plate movable along an arcuate path between a first and second position. The accelerator gear comprising a curved edge having teeth which engage the rack gear profile of the locking bolt, and an opposing edge having a centrally located notch for engagement of a cam of a lock cylinder. Wherein as the cam rotates about the lock cylinder it engages the notch and urges the accelerator gear from the first position to the second position, which urges the locking bolt from the first position to the second position.

11 Claims, 8 Drawing Sheets

(56) References Cited

U.S. PATENT DOCUMENTS

| | | | | | | |
|---|---|---|---|---|---|---|
| 189,438 | A | * | 4/1877 | Eichmuller | E05C 1/06 | 292/142 |
| 194,000 | A | * | 8/1877 | Sargent | E05C 1/06 | 292/142 |
| 353,059 | A | * | 11/1886 | Hanson | E05B 63/0017 | 292/140 |
| 460,498 | A | * | 9/1891 | Berry | E05B 63/0017 | 70/134 |
| 481,421 | A | * | 8/1892 | Price | E05B 17/042 | 70/462 |
| 488,750 | A | * | 12/1892 | Buisson | E05B 63/0017 | 70/134 |
| 528,208 | A | * | 10/1894 | Parslow | E05B 85/22 | 292/172 |
| 745,042 | A | * | 11/1903 | Daves | E05B 63/20 | 292/185 |
| 753,642 | A | * | 3/1904 | Sliga | E05B 65/0864 | 292/99 |
| 845,613 | A | * | 2/1907 | Caldwell | E05B 63/0017 | 70/403 |
| 977,783 | A | * | 12/1910 | Coleman | E05B 63/0017 | 70/350 |
| 1,004,690 | A | * | 10/1911 | Russell | E05B 63/0017 | 70/393 |
| 1,071,567 | A | * | 8/1913 | Outwater | E05B 65/1006 | 292/142 |
| 1,124,983 | A | * | 1/1915 | Whitaker | E05B 83/02 | 292/187 |
| 1,143,398 | A | * | 6/1915 | Hoschek | E05B 63/0017 | 70/92 |
| 1,148,626 | A | * | 8/1915 | Roberts | E05B 63/0017 | 70/129 |
| 1,169,659 | A | * | 1/1916 | Lowell | E05C 1/06 | 292/150 |
| 1,188,285 | A | * | 6/1916 | Leclerc | E05B 63/0017 | 70/DIG. 49 |
| 1,261,882 | A | * | 4/1918 | Wisely | E05B 15/0093 | 292/183 |
| 1,299,199 | A | * | 4/1919 | Lypka | E05B 63/0017 | 70/284 |
| 1,330,650 | A | * | 2/1920 | Pehel | E05B 63/0017 | 70/134 |
| 1,445,723 | A | * | 2/1923 | Shilanski | E05B 63/0017 | 70/284 |
| 1,487,328 | A | * | 3/1924 | Golden | E05B 63/12 | 292/150 |
| 1,511,956 | A | * | 10/1924 | Flagg | E05B 63/244 | 292/172 |
| 1,653,487 | A | * | 12/1927 | White | E05B 63/125 | 292/341.15 |
| 1,720,590 | A | * | 7/1929 | Evans | E05B 63/0017 | 70/129 |
| 1,857,225 | A | * | 5/1932 | Weber | E05B 63/0017 | 70/134 |
| 1,859,460 | A | * | 5/1932 | Peloquin | E05B 17/0033 | 49/277 |
| 2,046,790 | A | * | 7/1936 | Phillips | E05C 17/446 | 292/179 |
| 2,082,806 | A | * | 6/1937 | Michel | E05B 47/0603 | 70/282 |
| 2,771,313 | A | * | 11/1956 | Blake | E05C 1/06 | 70/89 |
| 3,175,376 | A | * | 3/1965 | Cantwell | E05B 17/042 | 70/145 |
| 4,154,070 | A | * | 5/1979 | Bahry | E05C 9/06 | 70/120 |
| 4,248,068 | A | * | 2/1981 | Esser | E05B 63/0017 | 70/389 |
| 4,384,465 | A | * | 5/1983 | Muus | E05B 13/005 | 292/172 |
| 4,483,162 | A | * | 11/1984 | Dunphy | E05B 63/0017 | 70/134 |
| 4,502,716 | A | * | 3/1985 | Tsai | E05B 63/0017 | 292/172 |
| 5,265,452 | A | * | 11/1993 | Dawson | E05B 17/042 | 70/277 |
| 5,280,881 | A | * | 1/1994 | Karmin | E05B 47/026 | 70/279.1 |
| 5,346,266 | A | * | 9/1994 | Bisbing | E05C 5/00 | 292/64 |
| 5,620,216 | A | * | 4/1997 | Fuller | E05C 9/185 | 292/142 |
| 5,881,589 | A | * | 3/1999 | Clark | E05B 47/0012 | 70/333 R |
| 5,911,766 | A | * | 6/1999 | Lieb | E05B 17/04 | 70/379 R |
| 6,983,962 | B2 | * | 1/2006 | Keightley | E05C 1/06 | 292/144 |
| 7,185,927 | B2 | * | 3/2007 | Talukdar | E05B 77/42 | 292/124 |
| 11,021,894 | B1 | * | 6/2021 | Zastrow | E05B 47/0004 | |
| 11,725,421 | B1 | * | 8/2023 | White | E05C 9/06 | 292/39 |
| 2002/0062670 | A1 | * | 5/2002 | Doong | E05B 63/0017 | 70/279.1 |
| 2015/0033808 | A1 | * | 2/2015 | Taylor | E05B 47/0001 | 70/101 |
| 2018/0209185 | A1 | * | 7/2018 | Long | B64D 11/02 | |
| 2022/0018169 | A1 | * | 1/2022 | Lai | E05C 9/063 | |
| 2023/0235596 | A1 | * | 7/2023 | Murray | E05C 9/046 | 70/277 |

FOREIGN PATENT DOCUMENTS

| | | | | | |
|---|---|---|---|---|---|
| DE | 19727878 | A1 | | 1/1999 | |
| EP | 2011937 | A1 | * | 1/2009 | E05B 63/0021 |
| FR | 1288323 | A | | 3/1962 | |
| FR | 2708305 | A1 | * | 2/1995 | E05B 17/042 |
| GB | 2331785 | A | * | 6/1999 | E05B 63/0021 |
| SE | 453107 | B | * | 1/1988 | E05B 47/0012 |
| WO | 2018217477 | A1 | | 11/2018 | |

* cited by examiner

LONG THROW LOCK

The present invention relates to a lock with an extended bolt throw with a single turn of the key. Specifically, it relates to a lock compatible with a lock cylinder and an extended bolt throw with a single turn of the key. More specifically, the present invention relates to a lock compatible with a lock cylinder with a cam, the lock having an extended bolt throw with a single turn of the key and the lock cylinder requiring no modifications.

BACKGROUND OF THE INVENTION

Long bolt throw locks are hugely useful in any situation where the lock body and the securing section for the lock bolt are not in close proximity. One specific use among others is for gate locks.

Simple long bolt throw locks, especially for simple garden gates, have the bolt throw manually operated, in a bolt slide or the like. But where additional security is required, it is preferable for the lock to be key actuated. Key actuated long throw locks have the technical issue of actuating the full extended throw of the bolt with just the motion of turning the key, as common lock cylinders with cams only have the ability to drive the lock for about 170 degrees of the cam's rotation.

One of the main forms of key lock mechanisms used in long throw locks, along with most lock types, is the euro cylinder lock (originally known as the pin tumbler lock). Long bolt throw locks that are currently available require a modified euro cylinder lock 800 to actuate the extended bolt throw, typically fixed gears 850 as shown in FIG. 8. Modified euro cylinders are more complex and are not easily accessible in the market. This in turn increases the cost of key operated long bolt throw locks.

It is all object of the present, invention to provide a key operated long throw bolt lock which is compatible with a lock cylinder and cam. Therefore, it also provides a long throw lock which is easier and cheaper to manufacture, and easier to repair if damaged.

STATEMENT OF INVENTION

According to a first aspect of the invention, there is provided a lock with an extended bolt throw comprising a back plate, a locking bolt having a rack gear profile on at least a portion of one side, slidably mounted to the back plate movable between a first position and a second position. An accelerator gear mounted to the back plate is movable along an arcuate path between a first and second position. The accelerator gear comprises a curved edge having teeth which engage the rack gear profile of the locking bolt. An opposing edge has a centrally located notch for engagement of a cam of a lock cylinder, wherein as the cam rotates about the lock cylinder it engages the notch and urges the accelerator gear from the first position to the second position, which urges the locking bolt from the first position to the second position.

In an embodiment of the first aspect, the arcuate path followed by the accelerator gear is defined by a groove or slot in the back plate. The accelerator gear further comprises at least one protrusion on at least one side which slidably engages with the slot or groove of the back plate.

In an embodiment of the first aspect, the accelerator gear comprises two plates secured to either longitudinal side of the curved edge of the accelerator gear which takes the form of a curved gear track, the edges of the plates distal to the curved gear track both comprising the centrally located notch. At least one protrusion may be located on an outer surface of one of the plates.

In an embodiment of the first aspect, the accelerator gear further comprises two symmetrically opposed pivotally mounted locking arms movable between a primary and secondary position, each locking arm comprising elongate body, a first end of the body which when in the primary position is to situated in the area defined by the centrally located notch, a pivot point located substantially in the centre of the body, and the second end defining a hook, the second end extending away from respective longitudinal ends of the accelerator gear.

The back plate may further comprise two securing means located proximal each end respectively of the arcuate path defined by the groove or slot, each securing means engageable with the respective locking arm when the accelerator gear is in the first or second position respectively; in use, when a hook is in the primary position and engaged with securing means, the accelerator gear is held in that respective position until the locking lever is moved to the secondary position.

When the cam of the lock cylinder is engaged with the centrally located notch, it may further engage the first end of both locking levers and move them from the primary position to the secondary position.

The two locking levers may be biased towards the primary position.

In an embodiment of the first aspect, the lock comprises a second plate comprising an aperture for a lock cylinder and cam and a groove or slot defining the same arcuate path as the back plate, symmetrically opposed to the back plate sandwiching the locking bolt, securing means and gear accelerator therebetween.

An embodiment of the first aspect further comprises a casing which encompasses the whole lock, the casing having apertures for bolt movement therefrom and at least one further aperture allowing key access to the lock cylinder.

An embodiment of the first aspect wherein the lock cylinder is a standard euro cylinder with a cam. Alternatively the lock cylinder could be a round lock cylinder with a tang (such as a mortice lock cylinder) with an adaptor cam attached to the tang).

BRIEF DESCRIPTION OF THE FIGURES

The invention will be described in more detail, by way of example, with reference to the following drawings.

DETAILED DESCRIPTION

A preferred embodiment of the invention will now be described in relation to the figures.

Figure 1:
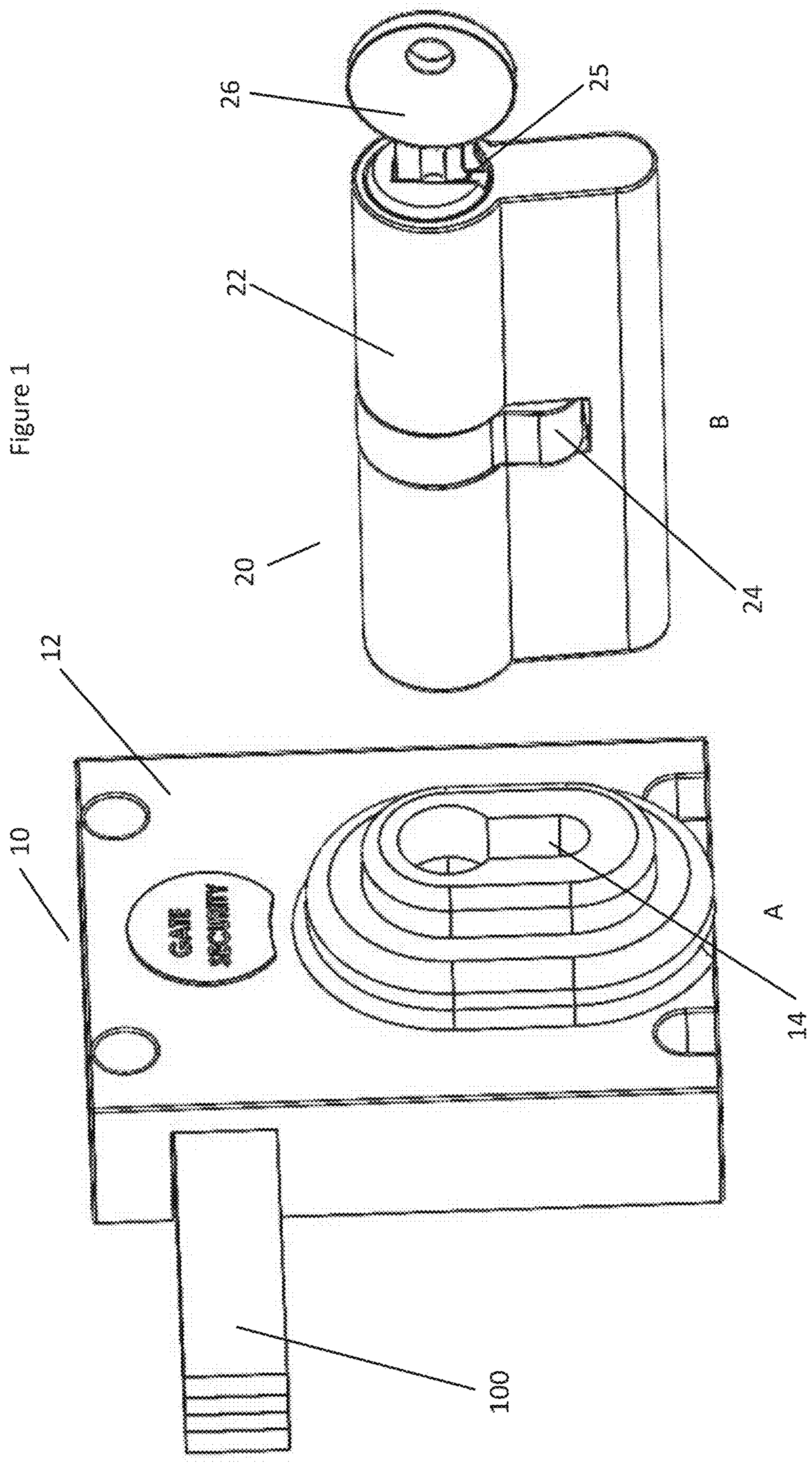
FIGS. 1A and 1B depict an embodiment of the invention and a euro cylinder.
Figure 2:
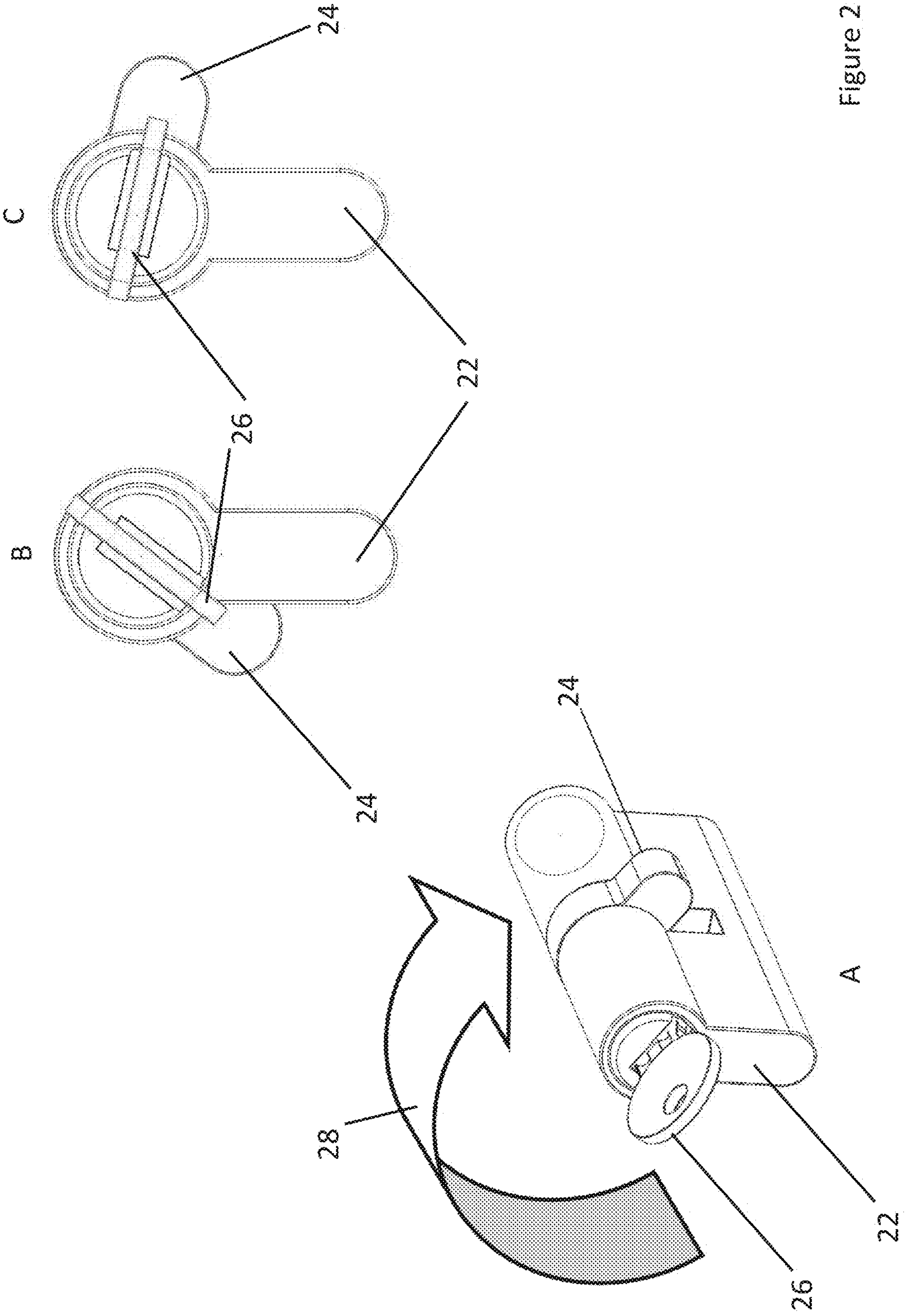
FIGS. 2A-C depict a euro cylinder and the motion of the cam as it rotates.

With reference to FIGS. 1A and 1B. A preferred embodiment of the lock 10 comprises a casing 12 with a locking bolt 100 mounted slidably therein. The casing 12 further comprises an aperture 14 for engaging with a standard euro cylinder (pin tumbler lock) 20. The standard euro cylinder 20 comprises an elongate body 22 and a cam 24, the cam rotating about the longitudinal axis when an appropriate key 26 is inserted into aperture 25 (located at one or optionally both ends of the euro cylinder 20) and rotated, as is standard and well known to a person skilled in the art. When the euro cylinder 20 is held within casing 12 of the lock 10, the rotating cam 14 engages with the paternal mechanisms (discussed in more detail below) of the lock 10 to actuate locking bolt 100, moving from a locked position to an unlocked position, or vice versa. The movement of the cam 24 as the key 26 is turned euro cylinder 20 is depicted in FIG. 2. FIG. 2B shows the position of the cam 24 at the beginning of rotation and FIG. 2C shows the cam 24 position towards the end of turning key 26. FIG. 2A shows the direction of rotation 28.

Figure 3:
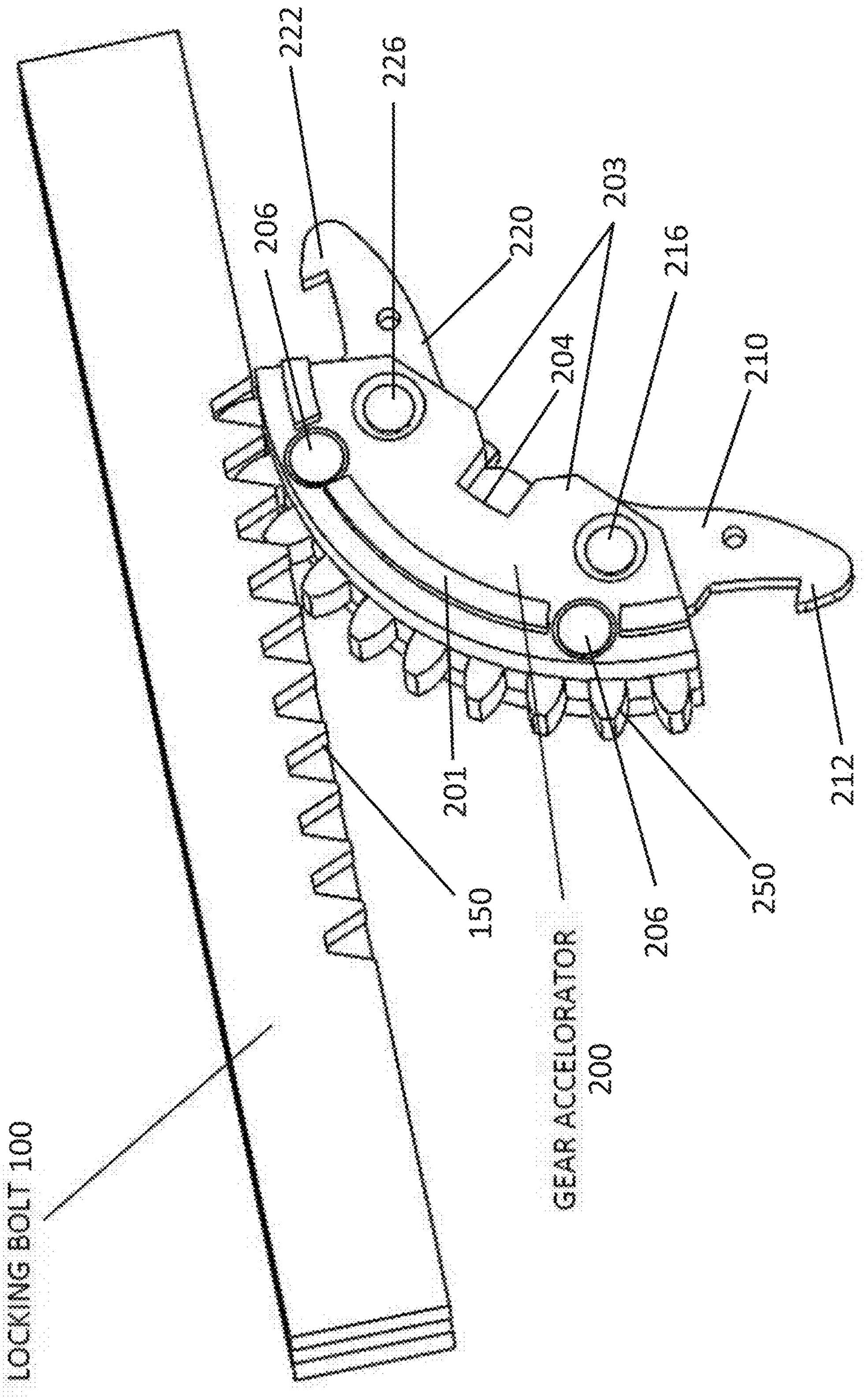
FIG. 3 depicts a gear accelerator and locking bolt of an embodiment of the present invention in its casing.

FIG. 3 depicts the locking bolt 100 and its engagement with gear accelerator 200 of the internal mechanism of lock 10. On an 'under' side of locking bolt 100 which faces the euro cylinder 20 when in use, there are the teeth of a gear rack 150. Gear rack 150 engages with gear accelerator 200 which on an 'upper' side thereof, which faces away from the euro cylinder 20 in use, has a plurality of teeth 250 in the from of a partial pinion gear/curved gear rack. Teeth 250 of the gear accelerator 200 engage with teeth 150 of the locking bolt 100, and as the gear accelerator 200 moves along an arcuate path it urges the bolt 100 to move laterally in the same lateral direction as the movement of actuate path of the gear accelerator 200. This provides a longer throw for bolt 100 than the movement provided if the bolt 100 was only urged to move by the motion of cam 24 of the euro cylinder 20.

Gear accelerator 200 comprises a body on which the teeth 250 are placed; this body houses lever arms 210 and 220, which are independently pivotably connected thereto via pivot points 216 and 226 respectively, and will be discussed in further detail below. On an underside of the body of gear accelerator 200 there is a cammed surface 203 with a central notch 204. Notch 204 engages with cam 24 as it rotates about the longitudinal axis of the euro cylinder body. While cam 24 is engaged with notch 204, as it rotates it urges the gear accelerator along its actuate path, which in turn throws the locking bolt 100.

Figure 4:
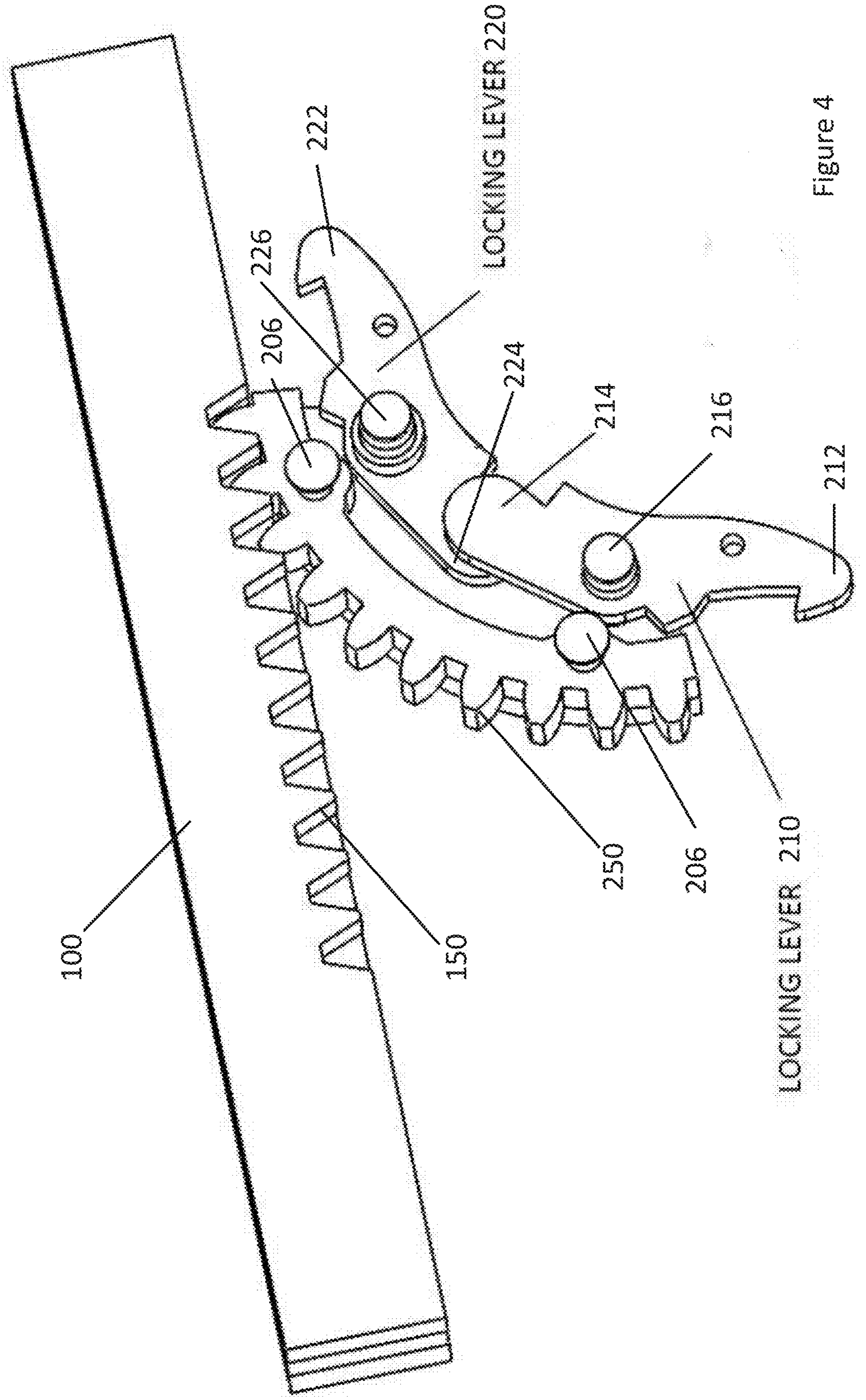
FIG. 4 depicts an uncovered gear accelerator and locking bolt of an embodiment of the present invention.

FIG. 4 depicts inside the gear accelerator 200 to give a clearer view of locking levers 210 and 220. Locking levers 210 and 220 are independently pivotable within gear accelerator 200 via pivot points 216 and 226 respectively. At their respective ends proximal the centre of gear accelerator 200 there are protrusions 214 and 224 respectively, which each extend into the area left open by notch 204 of the gear accelerator 200. At the respective proximal ends there are hooks 212 and 222 respectively. When cam 24 of the euro cylinder engages notch 204 of the gear accelerator 200 it also engages one or both of protrusions 214 and 224, urging one or both from a first position to a second position further into the body of gear accelerator 200. This causes one or both of the locking levers 210 and 220 to pivot about their respective pivot points and moves the hooks 212 and 222 from a corresponding first position to a corresponding second position. The locking levers 210 and 220 may be biased towards the first position by any suitable means known to a person skilled in the art such as spring bias, at the respective pivot points or otherwise etc.

FIGS. 3 and 4 also show pins 206, which are used to secure teeth 250 to the outer body of gear accelerator 200.

Figure 5:
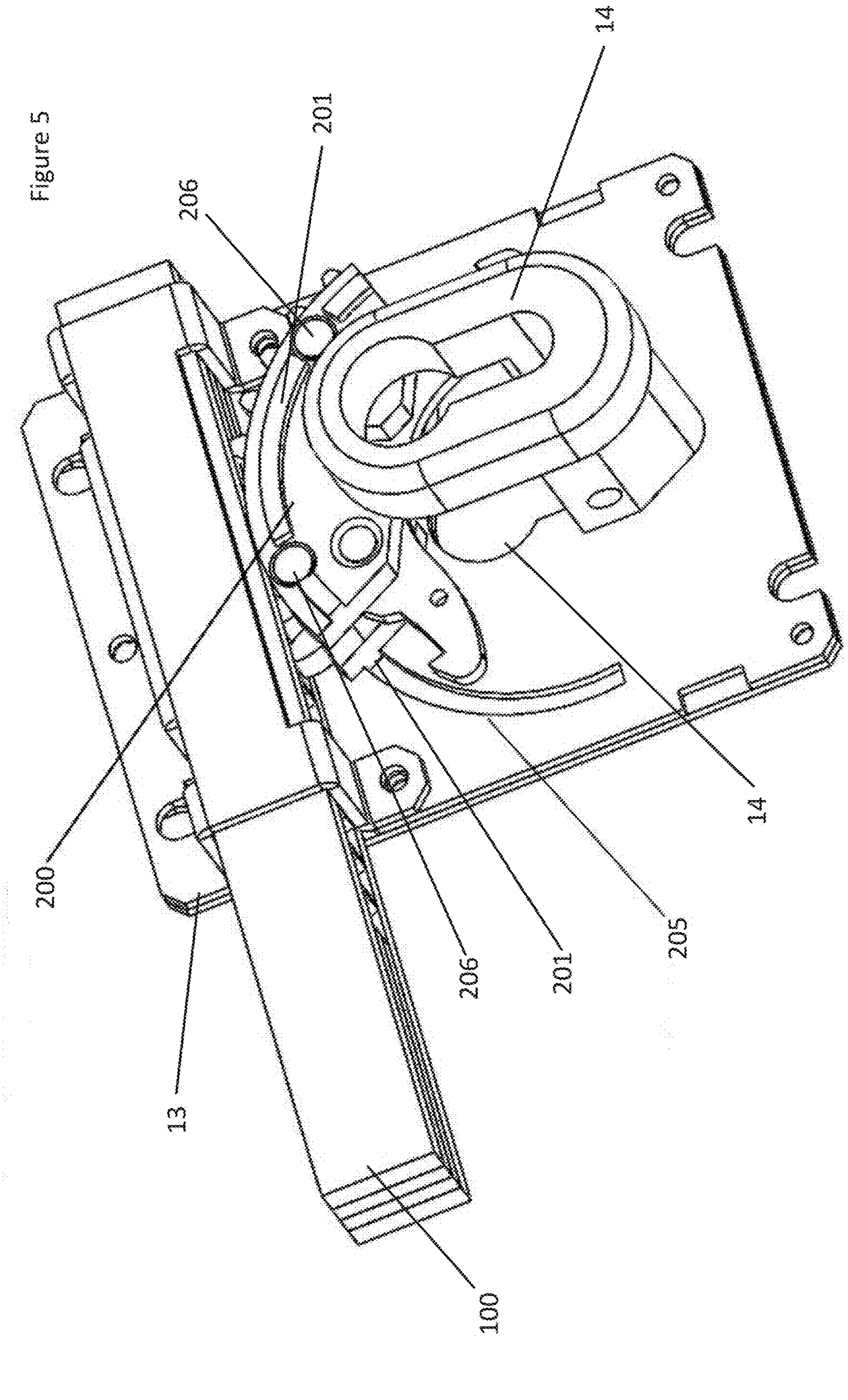
FIG. 5 depicts an internal view of embodiment of the invention.

FIG. 5 depicts the locking bolt 100, gear accelerator 200 and aperture 14 all mounted to an internal plate 13 of the lock 10. There may be a second internal plate 13 on the opposing side of the bolt, gear accelerator with aperture 14 symmetrical to the original internal plate 13, containing all the components between the two. Internal plate(s) 13 may be within or part of casing 12.

Internal plate(s) 13 comprise an arcuate groove/slot 205; this groove/slot 205 defines the actuate path taken by gear accelerator 200. Each side of gear accelerator 200 has an arcuate projection 201 protruding therefrom. Arcuate projections 201 slidably engage with groove/slots 205 and guide the motion of gear accelerator 200 as it is actuated by euro cylinder cam 24.

Figure 6:
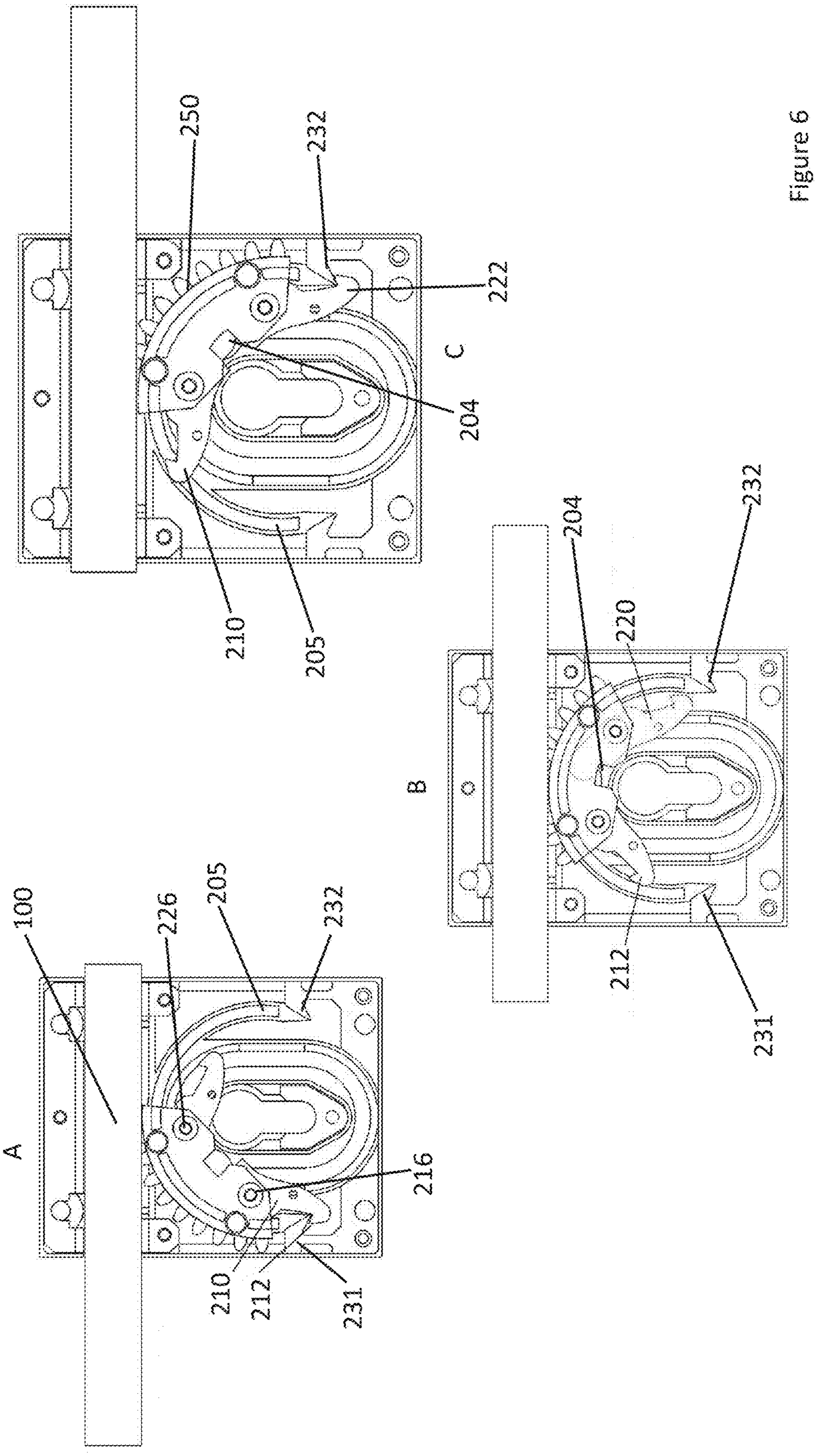
FIGS. 6A-C depict an internal view of an embodiment of the invention it moves from a first position to a second position.

FIGS. 6A-C depict an internal view of the internal mechanism of the lock 10 as it moves from a locked position to an unlocked position or vice versa. In addition to the components shown in FIG. 5, proximal to the ends of groove/slots 205 there are protrusions 231 and 232 respectively shaped as to engage with hooks 212 and 222 respectively. The euro cylinder 20 is not shown for clarity, but the direction of rotation 28 of cam 24 as shown in FIG. 2A is the same direction of rotation as the movement from FIG. 6A to 6C.

FIG. 6A depicts the lock 10 in a locked position(or at the start of a unlock/lock cycle), Locking bolt 100 is fully extended, gear accelerator 200 is at its leftmost position on its arcuate path (leftmost is just in relation to the figures the skilled person would know it could as easily be another direction depending on orientation of the lock). Locking lever 210 is in the first position and hook 212 is engaged with protrusions 231 holding gear accelerator 200 and therefore locking bolt 100 in place.

As key 26 is turned, cam 24 starts to rotate (in relation to the orientation of the figures) in a clockwise direction from the 6 o'clock position. As cam 24 moves, it engages locking lever 210 and moves along cammed surface 203 of gear accelerator 200 and reaches notch 204 where it urges locking lever 210 into the second position via engaging protrusion 214, causing lever 210 to pivot about pivot point 216, which moves hook 212 to the second position and releasing hook 212 from protrusion 231. At the same time, cam 24 via notch 204 starts to urge gear accelerator 200 along the arcuate path 205 via projections 201 of the gear accelerator 200. This also they via teeth 250 engaging with gear rack 150 of locking bolt 100, starts to actuate locking bolt 100 laterally.

As shown in FIG. 6B, the lock is about halfway through an unlocking/locking cycle. Cam 24 is engaged with notch 204 continuing to urge gear accelerator 200 along the arcuate path 205; locking bolt 100 is approximately halfway. Cam 24 is also engaged with protrusions 214 and 224 holding locking levers 210 and 220 in the second position, hook 222 being ready to engage protrusion 232 at the end of the unlocking/locking cycle.

As shown in FIG. 6C, as the unlocking/locking cycle comes to an end, first gear accelerator 200 reaches the rightmost position of the arcuate path 205, which halts its movement; locking bolt 100 is extended fully to the right, and hook 222 of locking lever 220 is still in the second position proximal protrusion 232. As cam 24 continues to rotate clockwise, it disengages with notch 204 and protrusions 214 and 224, allowing/urging lever 220 into the first position wherein hook 222 is now engaged with protrusion 232, holding the accelerator gear 200 and locking bolt 100 in place.

As would be clear to a person skilled in her art, the unlocking/locking cycle can work in either direction and the invention would not be limited to the left and right directions used to describe the workings of the embodiment.

Figure 7:
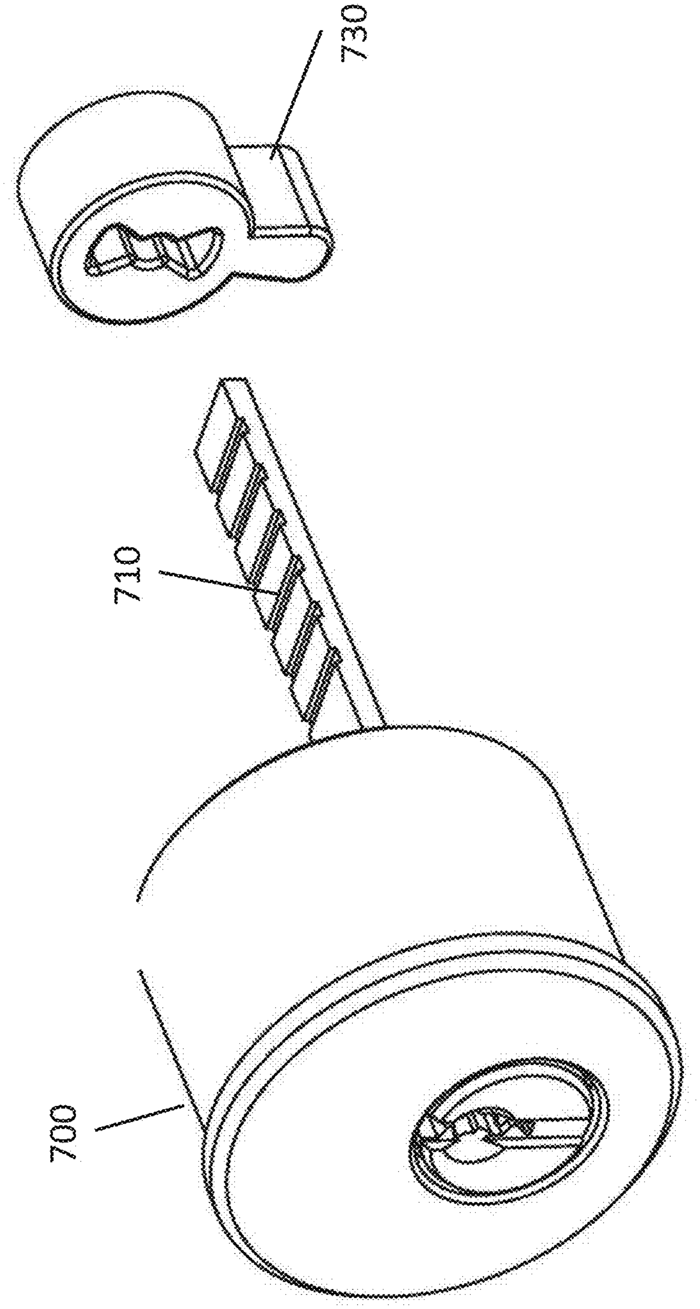
FIG. 7 depicts an alternate lock cylinder which can be used with the present invention.
Figure 8:
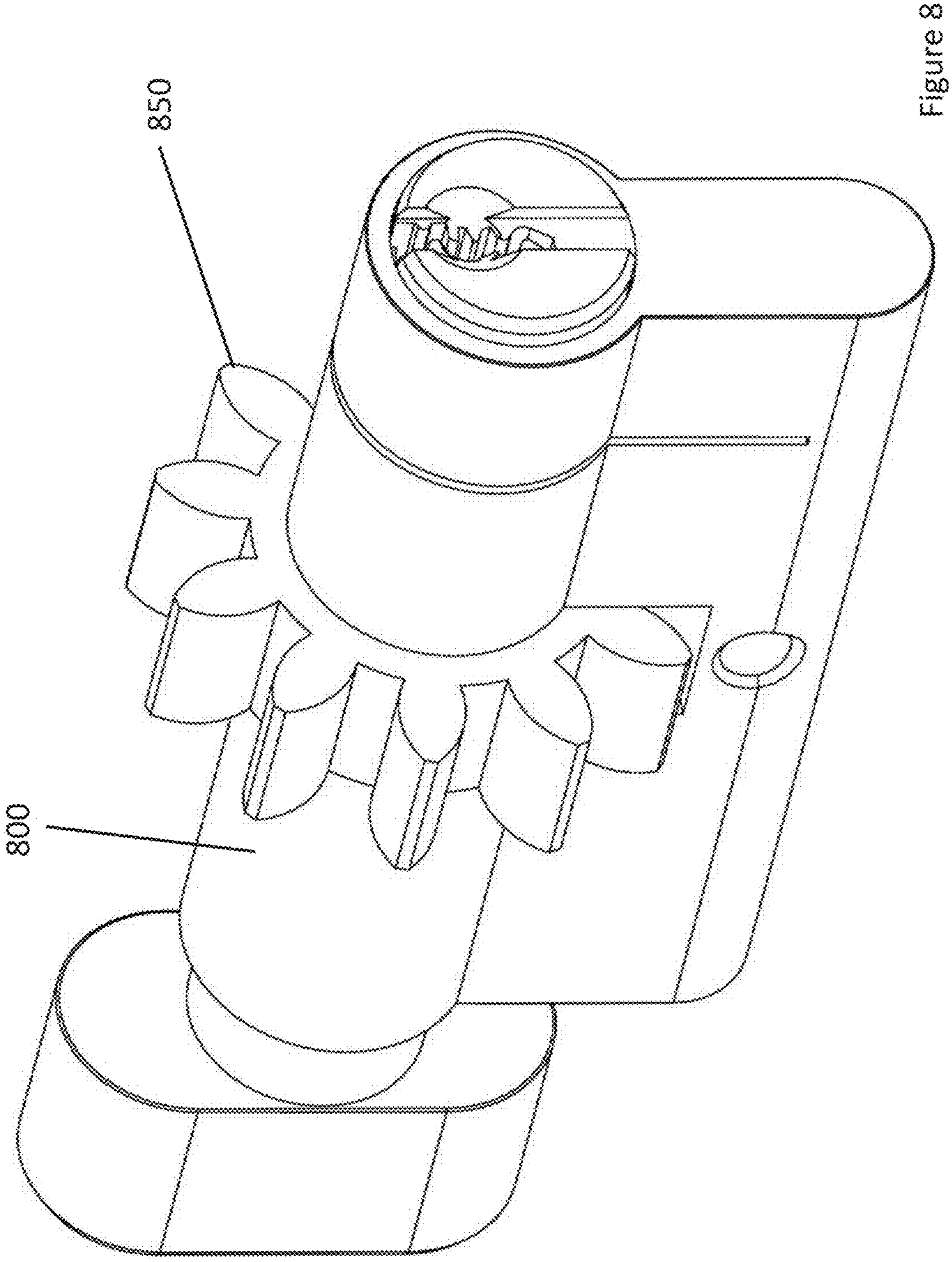
FIG. 8 depicts a modified euro cylinder lock.

The above-described embodiment has been made in respect to use with a standard euro cylinder, however the invention does not need to be limited to just euro cylinder locks. The aperture(s) 14 could alternatively be shaped to hold any type of lock cylinder. For example as shown in FIG. 7 the lock cylinder could be a round cylinder 700 with a tang 710 (such as a mortice lock cylinder) with a cam adaptor 730, instead of the standard euro cylinder described above. The cam adaptor 730 operating in the same way as cam 24 above.

The invention has been described with reference to a preferred embodiment. The description is intended to enable a skilled person to make the invention, not to limit the scope of the invention. The scope of the invention is determined by the claims.

What is claimed is:

1. A lock with an extended bolt throw comprising:

a back plate, having an aperture engageable with a lock cylinder which comprises a cam;

a locking bolt having a rack gear profile on at least a portion of one side, slidably mounted to the back plate and movable between a first position and a second position;

an accelerator gear mounted to the back plate movable along an arcuate path between a first and second position, the accelerator gear comprising a curved edge having teeth which engage the rack gear profile of the locking bolt, an opposing edge having a centrally located notch for engagement of the cam of the lock cylinder;

wherein as the cam rotates about the lock cylinder it engages the centrally located notch and urges the accelerator gear from the first position to the second position, which urges the locking bolt from the first position to the second position; and wherein the accelerator gear further comprises two symmetrically opposed pivotally mounted locking arms movable between a primary and secondary position, each locking arm comprising an elongate body, a first end of the elongate body, which when in the primary position is situated in an area defined by the centrally located notch, a pivot point located substantially in the center of the body and the second end defining a hook, the second end extending away from respective longitudinal ends of the accelerator gear.

2. The lock according to claim 1, wherein the arcuate path followed by the accelerator gear is defined by a groove or slot in the back plate; and the accelerator gear further comprises at least one protrusion on at least one side which slidably engages with the slot or groove of the back plate.

3. The lock according to claim 1, wherein the accelerator gear comprises two plates having edges, the plates being secured to either longitudinal side of the curved edge of the accelerator gear which takes the form of a curved gear track, the edges of the plates distal to the curved gear track both comprising the centrally located notch.

4. The lock according to claim 3, wherein the at least one protrusion located on an outer surface of one of the plates of the accelerator gear.

5. The lock according to claim 1, wherein the back plate further comprises two securing means located proximal each end respectively of the arcuate path defined by the groove or slot, each securing means engageable with the respective locking arm when the accelerator gear is in the first or second position respectively; in use, when a hook is in the primary position and engaged with securing means, the accelerator gear is held in that respective position until the locking lever is moved to the secondary position.

6. The lock according to claim 5, wherein when the cam of the lock cylinder is engaged with the centrally located notch, it further engages the first end of both locking levers and moves them from the primary position to the secondary position.

7. The lock according to claim 1, wherein the two locking levers are biased towards the primary position.

8. The lock according to claim 1, wherein the lock comprises a second plate comprising an aperture for the lock cylinder and cam and a groove or slot defining the same arcuate path as the back plate, symmetrically opposed to the back plate sandwiching the locking bolt, securing means and gear accelerator therebetween.

9. The lock according to claim 1, further comprising a casing which encompasses the lock, the casing having an aperture for bolt movement therefrom and at least one further aperture allowing key access to the lock cylinder.

10. The lock according to claim 1, wherein the lock cylinder is a standard euro cylinder comprising the cam.

11. The lock according to claim 1, wherein the lock cylinder is a round cylinder comprising a tang attached to the cam, wherein the cam is an adaptor cam.

* * * * *